(12) United States Patent
Goy et al.

(10) Patent No.: US 11,946,420 B1
(45) Date of Patent: Apr. 2, 2024

(54) FUEL SYSTEMS HAVING THERMAL RECIRCULATION

(71) Applicant: Hamilton Sundstrand Corporation, Charlotte, NC (US)

(72) Inventors: Edward W. Goy, Crystal Lake, IL (US); Ryan Prescott Susca, Windsor, CT (US); Ryan Shook, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/213,053

(22) Filed: Jun. 22, 2023

(51) Int. Cl.
| | | |
|---|---|---|
| *F02C 7/236* | (2006.01) |
| *F02C 7/14* | (2006.01) |
| *F02C 7/22* | (2006.01) |
| *F02C 7/232* | (2006.01) |
| *F02C 9/32* | (2006.01) |

(52) U.S. Cl.
CPC ........... *F02C 7/236* (2013.01); *F02C 7/14* (2013.01); *F02C 7/222* (2013.01); *F02C 7/232* (2013.01); *F02C 9/32* (2013.01)

(58) Field of Classification Search
CPC .. F02C 7/22; F02C 7/222; F02C 7/236; F02C 9/46; F04D 15/0072; F04C 14/02; F04C 15/0072; F04C 41/06
See application file for complete search history.

(56) References Cited

U.S. PATENT DOCUMENTS

| | | | | |
|---|---|---|---|---|
| 6,487,847 | B1 * | 12/2002 | Snow ................... | F02K 3/10 |
| | | | | 60/764 |
| 6,584,762 | B2 * | 7/2003 | Snow ................... | F02K 3/10 |
| | | | | 60/204 |
| 7,185,485 | B2 * | 3/2007 | Lewis .................. | F02C 9/263 |
| | | | | 60/764 |
| 7,584,602 | B2 | 9/2009 | Lewis | |
| 7,610,760 | B2 | 11/2009 | Clements | |
| 7,770,388 | B2 | 8/2010 | Desai | |
| 8,408,233 | B2 | 4/2013 | Reuter et al. | |
| 8,789,353 | B2 | 7/2014 | Bickley | |
| 8,834,134 | B2 * | 9/2014 | Baker .................. | F02C 7/236 |
| | | | | 123/446 |
| 9,512,783 | B2 | 12/2016 | Veilleux, Jr. et al. | |
| 10,267,237 | B2 | 4/2019 | Pool et al. | |
| 10,309,313 | B2 | 6/2019 | Gomes et al. | |
| 10,502,138 | B2 * | 12/2019 | Reuter ................. | F02C 9/263 |
| 11,267,580 | B2 * | 3/2022 | Mastrocola ........... | B64D 37/10 |
| 2003/0074884 | A1 * | 4/2003 | Snow ................... | F02C 9/48 |
| | | | | 60/764 |

(Continued)

*Primary Examiner* — Alain Chau
(74) *Attorney, Agent, or Firm* — Locke Lord LLP; Joshua L. Jones; Scott D. Wofsy

(57) ABSTRACT

A fuel system includes a main pump assembly. The main pump assembly has a main fuel pump connected to an input line, a recirculation pump connected to the input line, and a fuel recirculation system. A recirculation control includes a first selector valve in fluid communication with an outlet line of the recirculation pump, with a recirculation return line connected to return fuel to the input line, and with an inter-valve line. The recirculation control includes a second selector valve in fluid communication with the inter-valve line, with a back-up line connecting the second selector valve to a main fuel control, and with a cooler recirculation line connected to supply the one or more coolers.

20 Claims, 3 Drawing Sheets

(56) References Cited

U.S. PATENT DOCUMENTS

| | | |
|---|---|---|
| 2013/0036738 A1 | 2/2013 | Pora |
| 2016/0230669 A1* | 8/2016 | Selstad .................... F02C 7/14 |
| 2017/0292451 A1* | 10/2017 | Reuter ..................... F02C 7/22 |
| 2020/0198799 A1* | 6/2020 | Mastrocola ............ B64D 37/04 |
| 2022/0195926 A1 | 6/2022 | Pora et al. |

* cited by examiner

FUEL SYSTEMS HAVING THERMAL RECIRCULATION

FIELD

This disclosure relates to fuel systems having thermal recirculation.

BACKGROUND

Traditional fuel systems for aircraft, for example, can include fuel thermal transfer to use fuel for cooling, for example. Traditionally, the cooling components are downstream of the main fuel control and driven by the main fuel pump, requiring the main fuel pump to be sized to drive all loads.

Such conventional methods and systems have generally been considered satisfactory for their intended purpose. However, there is still a need in the art for improvements. The present disclosure provides a solution for this need.

SUMMARY

A fuel system includes a main pump assembly. The main pump assembly has a main fuel pump connected to an input line and configured to pump fuel to a main fuel control via a main fuel control line, a recirculation pump connected to the input line, and a fuel recirculation system connected to an outlet line of the recirculation pump and upstream of the main fuel control. The fuel recirculation system is configured to select a mode from a plurality of modes, wherein the plurality of modes include a recirculation mode and a backup mode. The fuel recirculation system is configured to recirculate fuel from the recirculation pump to a tank through one or more coolers in the recirculation mode, and provide fuel to the main fuel control in the backup mode. A recirculation control is configured to select between the recirculation mode and the backup mode. The recirculation control includes a first selector valve in fluid communication with the outlet line of the recirculation pump, with a recirculation return line connected to return fuel to the input line, and with an inter-valve line. The first selector valve is configured to select between connecting the outlet line of the recirculation pump with either the recirculation return line or with the inter-valve line. The recirculation control includes a second selector valve in fluid communication with the inter-valve line, with a back-up line connecting the second selector valve to the main fuel control, and with a cooler recirculation line connected to supply the one or more coolers. The second selector valve is configured to select between connecting the inter-valve line with either the back-up line or with the cooler recirculation line.

A check valve can be included in the backup line, configured to open to provide backup fuel flow to the main fuel control from the recirculation pump in the backup mode and to prevent back flow in the backup line otherwise. The cooler recirculation line can include a pressure regulating valve configured to only allow flow through the cooler recirculation line above a predetermined pressure.

The second selector valve can be passively controlled based on pressure in the backup line. The recirculation control can include an electrohydraulic servo valve (EHSV) connected in fluid communication with the outlet line of the recirculation pump, with the recirculation return line, and with a control line connecting the EHSV in fluid communication with a control port of the first selector valve for control of the first selector valve.

The plurality of modes can include a bypass mode, wherein the fuel recirculation system is configured to bypass the one or more coolers in the bypass mode, and wherein the recirculation control is configured to select between the recirculation mode, the backup mode, and the bypass mode. The fuel recirculation system can include the one or more coolers in fluid communication with the recirculation control downstream of the recirculation control, and in fluid communication with a tank via a tank return line.

The system can include the main fuel control connected to the main fuel control line of the main pump assembly and the backup line. An augmenter pump fuel control can be in fluid communication with the inlet line in parallel with the main fuel control, the main fuel pump, and the recirculation pump. An actuator pump fuel control can be included in fluid communication with the inlet line in parallel with the augmenter pump fuel control. The main fuel control, the augmenter pump fuel control, and the actuator pump fuel control can be interconnected for mutual backup.

A filter can be included in the input line upstream of the main pump and of the recirculation pump. The recirculation return line can be connected in fluid communication to return fluid to the input line upstream of the filter in the bypass mode.

The main fuel pump and the recirculation pump can be positive displacement pumps. The positive displacement pumps can be vane pumps. The positive displacement pumps can be gear pumps. The system can include a boost pump with an boost inlet connected to a tank line to supply the boost pump from tank. An outlet of the boost pump can be connected to supply the input line. The boost pump, and at least one of the positive displacement pumps can be connected to rotate together on a single shaft. The system can include a fuel tank connected in fluid communication to supply the boost pump. The tank can be connected to receive cooled fuel from the one or more coolers.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
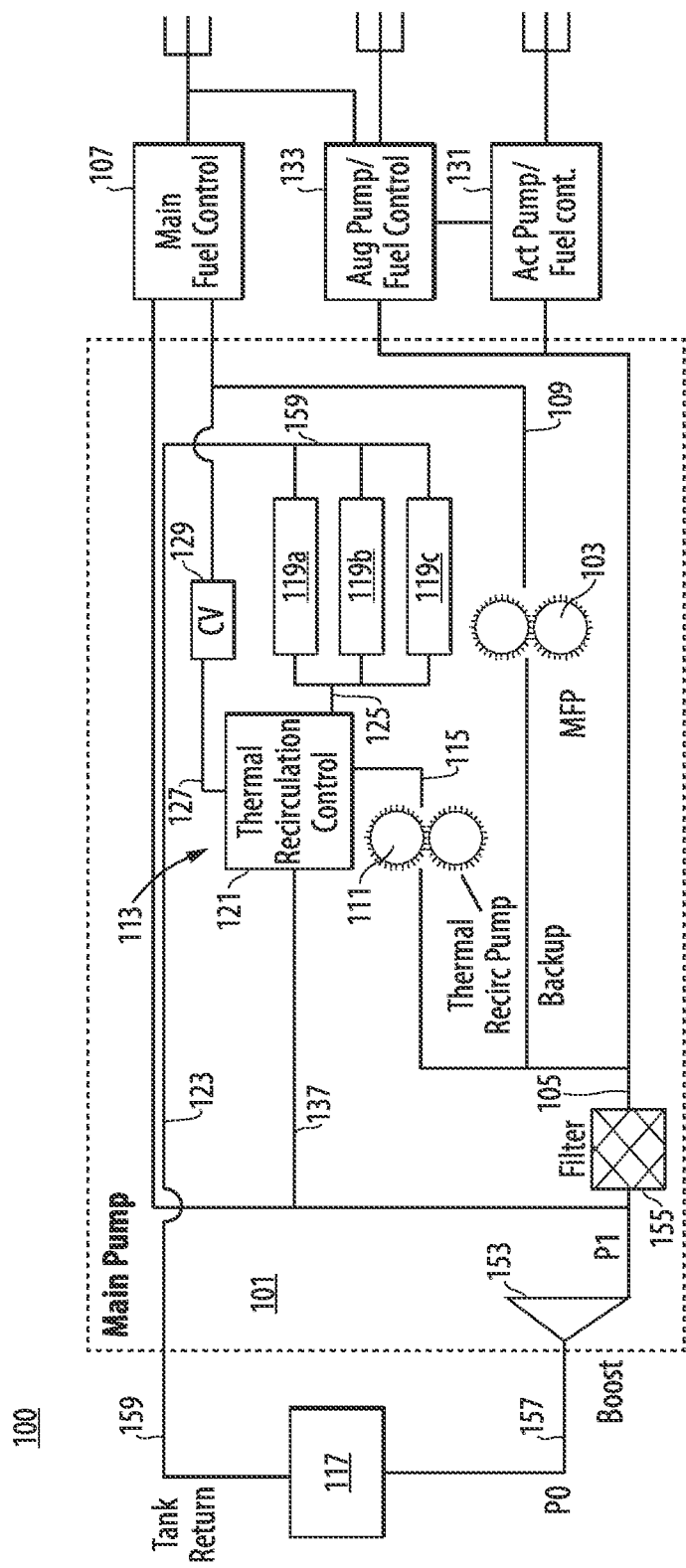
FIG. 1 is a schematic view of an embodiment of a system in accordance with this disclosure, shown having gear pumps.
Figure 2:
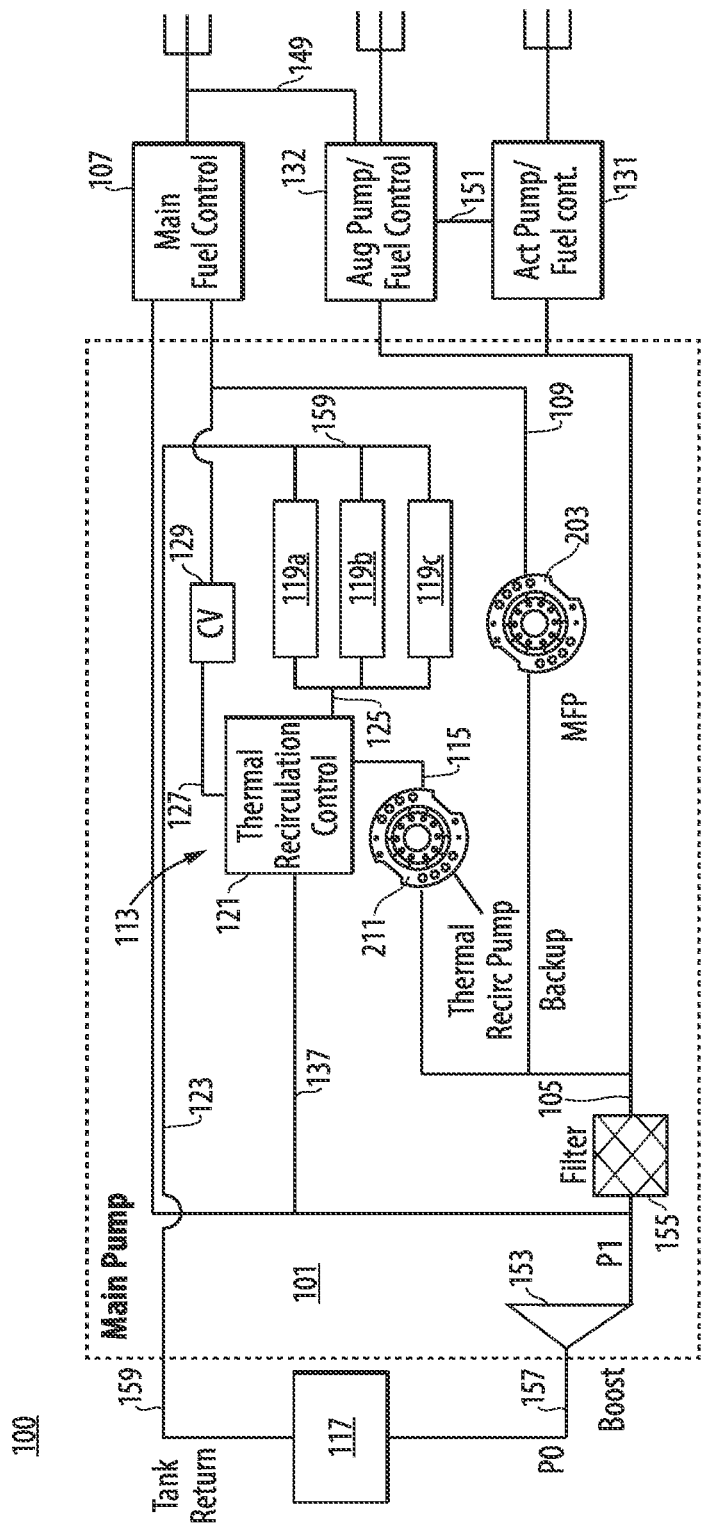
FIG. 2 is a schematic view of an embodiment of a system in accordance with this disclosure, shown having vane pumps.
Figure 3:
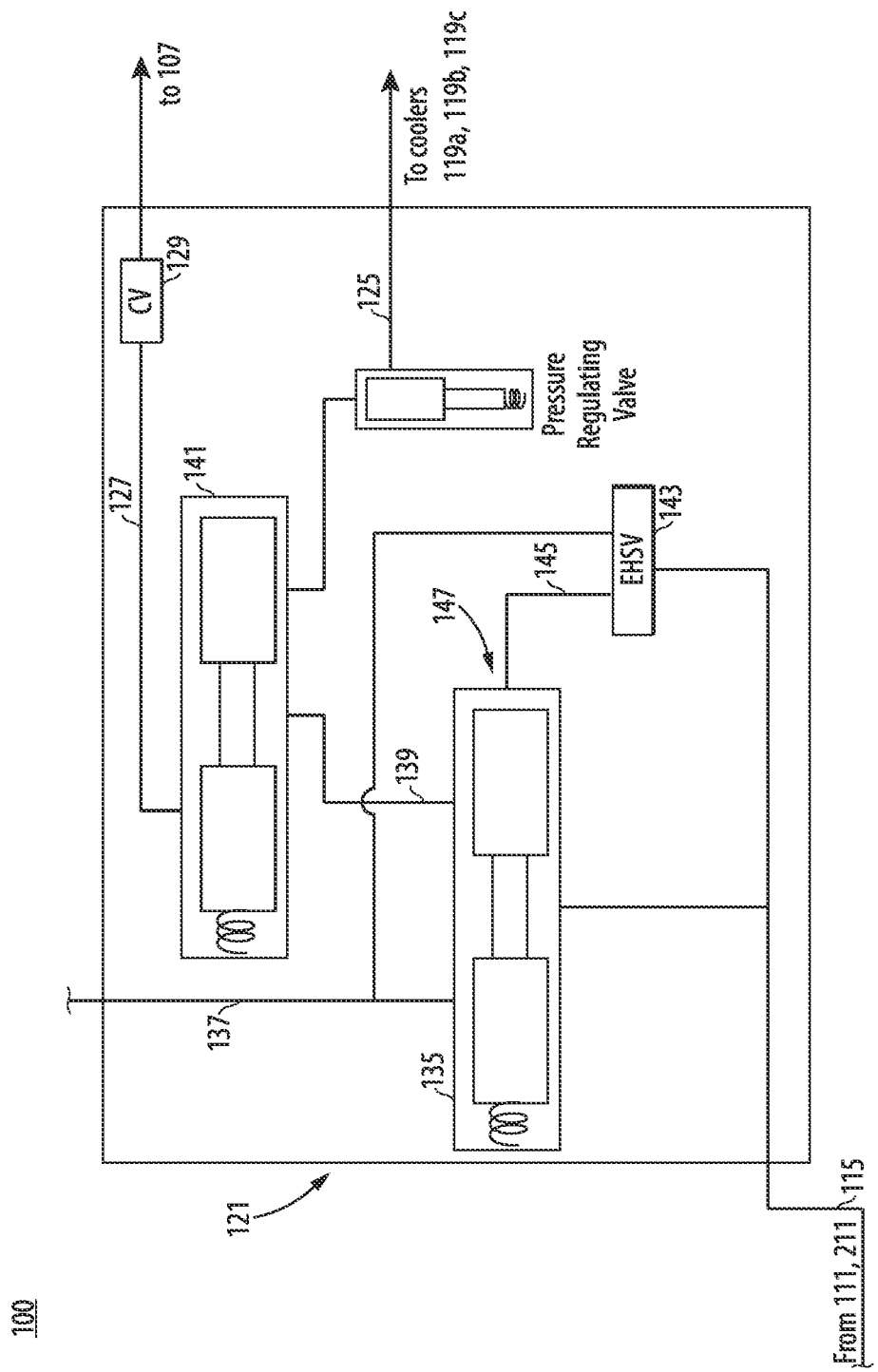
FIG. 3 is a schematic view of the recirculation control of the system of FIGS. 1 and 2, showing the selector valves.

Reference will now be made to the drawings wherein like reference numerals identify similar structural features or aspects of the subject disclosure. For purposes of explanation and illustration, and not limitation, an illustrative view of an embodiment of a fuel system in accordance with the disclosure is shown in FIG. 1 and is designated generally by reference character 100. Other embodiments, views, and/or aspects of this disclosure are shown in FIGS. 2-3.

In accordance with at least one aspect of this disclosure, a fuel system 100 can include a main pump assembly 101 having a main fuel pump 103 connected to an input line 105 (e.g., on a main fuel pump branch as shown) and configured to pump fuel to a main fuel control 107 via a main fuel control line 109. The main pump assembly 101 can include a recirculation pump 111 connected to the input line 105 (e.g., via the outlet line 115 of the recirculation pump 111, 211), and a fuel recirculation system 113 connected to the recirculation pump 111 (e.g., via a recirculation pump output line 115) and upstream of the main fuel control 107. The fuel recirculation system 113 can be configured to select a mode from a plurality of modes. The plurality of modes can include a recirculation mode and a backup mode. The fuel recirculation system 113 can be configured to recirculate fuel from the recirculation pump 111 to a tank 117 through one or more coolers 119a, 119b, 119c in the recirculation mode, and to provide fuel to the main fuel control 107 in the backup mode.

The fuel recirculation system 113 includes a recirculation control 121 configured to select between the recirculation mode and the backup mode. In certain embodiments, the plurality of modes can include a bypass mode. The fuel recirculation system 113 can be configured to bypass the one or more coolers 119a, b, c in the bypass mode. The recirculation control 121 can be configured to select between the recirculation mode, the backup mode, and the bypass mode, for example.

In certain embodiments, the fuel recirculation system 113 can include the one or more coolers 119a, b, c in fluid communication with the recirculation control 121 downstream of the recirculation control 121. The one or more coolers 119a, b, c can also be in fluid communication with a tank 117 via a tank return line 123, for example.

The fuel recirculation control 121 can be configured to connect to the one or more coolers 119a, b, c via a cooler recirculation line 125 (e.g., having one or more branches as shown), and to connect to the main fuel control 107 via a backup line 127. In certain embodiments, the system 100 (and/or the main pump assembly 101) can include a check valve 129 in the backup line 127, which can be located inside the recirculation control 121 as shown in FIG. 3, or outside the recirculation control 121 as shown in FIGS. 1 and 2. The backup line 127 can be connected to the main fuel control line 109. For example, in the backup mode when a pressure from the recirculation control 121 exceeds a pressure from the main fuel pump 103, the check valve 129 can be configured to open to provide backup fuel flow to the main fuel control 107 from the recirculation pump 111, and otherwise the check valve 129 can prevent back flow in the backup line 127.

In certain embodiments, the system 100 can include the main fuel control 107 connected to the main fuel control line 109 and the backup line 127 of the main pump assembly 101. In certain embodiments, the system 100 can include an actuation pump fuel control 131 in fluid communication with the input line 105 in parallel with the main fuel pump 103 and in parallel with the recirculation pump 111. In certain embodiments, the system 100 can include an augmenter pump fuel control 133 in fluid communication with the inlet line 105 in parallel with the actuation pump system 131, the main fuel pump 103, and the recirculation pump 111. The main fuel control 107, the augmenter pump fuel control 133, and the actuator pump fuel control 131 are interconnected for mutual backup, e.g. by lines 149, 151.

In accordance with at least one aspect of this disclosure, a fuel system for an aircraft can include any suitable fuel system disclosed herein, e.g., system 100 as described above. In certain embodiments, e.g., as shown in FIGS. 1 and 2, the main fuel pump 103, 203 and the recirculation pump 111, 211 can each be positive displacement pumps. FIG. 1 shows the system 100 having gear pumps for the main fuel pump 103 and recirculation pump 111. FIG. 2 shows the system 200 having vane pumps for the main fuel pump 103 and recirculation pump 111. The boost pump 153, and at least one of the positive displacement pumps 111/211, 103/203 are connected to rotate together on a single shaft, i.e. at the same rotational speed. The pumps 111/211, 103/203 can each be sized for larger systems than needed in their normal operation. Pumps with smaller normal loads can use their extra capacity to provide extra volume to the other pump(s) when needed. Normally some flow is returned to the tank 117 when using pumps with fixed displacement.

Embodiments can provide thermal cooling of the fuel upstream of the main fuel control. Embodiments can also provide backup pumping if the main fuel pump fails, for example, using the recirculation pump. Traditionally, the main fuel control operates at thousands of PSI (pounds per square inch, e.g. where 1000 PSI equals 6.89 megapascals), and cooling of fuel occurs downstream of the main fuel control. In such traditional systems, the main fuel pump has to raise pressure to account for the cooling. Embodiments have thermal exchange upstream of main fuel control and can use unused pressure from the recirculation pump. Embodiments can reduce both pressure and flow in main fuel line, for example.

Embodiments can include various types of coolers, for example, and/or can be in series, parallel, or each could have its own control valve (e.g., in the recirculation control or through other valves). Embodiments can include a recirculation control that can selectively direct flow through coolers, or back to a filter (e.g., as shown), or through a check valve to the main fuel control in a backup mode.

In certain embodiments, the recirculation pump can be on same shaft as main fuel pump and may only be required to pump out hundreds of PSI for cooling, for example, in a recirculation mode. In embodiments, the recirculation pump can now take some of the pressure and flow load from the main fuel pump to provide cooling, for example. This can improve the efficiency of each pump. Embodiments can reduce power usage and possibly provide weight savings due to thermal efficiency. Reducing fuel system weight and pump system heat rejection can ultimately allow an aircraft to carry more fuel and increase aircraft heat rejection into the fuel.

Thermal recirculation and cooling can be handled by a second pumping element within the main fuel pump assembly, for example. In certain embodiments, the second element can be either dedicated recirculation flow to downstream coolers or it can be a backup pumping element to the main fuel pump pumping element. The secondary pumping element can provide total cooling and tank return flow, for example.

Embodiments, can move all coolers into a low pressure zone to reduce weight. Embodiments can reduce pump rise required from boost stage to reduce horsepower extraction. Embodiments can provide independent control of thermal recirculation flows. Embodiments can provides a backup pumping stage to the main fuel pump for failure immunity.

With reference now to FIG. 3 wherein the recirculation control 113 includes a first selector valve 135 in fluid communication with the outlet line 115 of the recirculation pump 111, 211, with a recirculation return line 137 connected to return fuel to the input line 105, and with an inter-valve line 139. The first selector valve is configured to select between connecting the outlet line 115 of the recirculation pump 111, 211 with either the recirculation return line 137 (for the bypass mode) or with the inter-valve line 139 (for the recirculation mode or the backup mode).

A second selector valve 141 of the recirculation control 121 is connected in fluid communication with the inter-valve line 139, with the back-up line 127 connecting the second selector valve 141 to the main fuel control 107, and with the cooler recirculation line 125 connected to supply the one or more coolers 119*a-c*. The second selector valve 141 is configured to select between connecting the inter-valve line 139 with either the back-up line 127 for the backup mode, or with the cooler recirculation line 125 for the recirculation mode with cooling. The cooler recirculation line 125 includes a pressure regulating valve configured to only allow flow through the cooler recirculation line 125 above a predetermined pressure.

With continued reference to FIG. 3, the second selector valve 141 can be passively controlled based on pressure in the backup line 127 and in the inter-valve line 139 to select the backup mode in the event of pressure loss at the main fuel control 107, and otherwise to select the cooler recirculation line 125. The left side of the second selector valve 141, as oriented in FIG. 3, has a relatively light spring and is exposed to the pressure in the backup line 127 downstream of the CV 129. The right side of the selector valve 141, as it is oriented in FIG. 3, would reference the pressure from line the inter-valve line 139. The spring of the valve 141 biases the valve member of the valve 141 to right in the absence of all pump pressure, or in normal operation whether Pmain (in the backup line 127) is higher than Pcooler (in the cooler recirculation line 125). In the event the function of the main pump 103, 203 is lost, the valve 141 will shuttle to the left, as it is oriented in FIG. 3, because the pressure in the inter-valve line 139 will be greater than Pspring+P127, where Pspring is the pressure to overcome the force of the spring of the valve 141, and P127 is the pressure in the line 127.

The first selector valve 135 can be actively controlled. The recirculation control 121 includes an electrohydraulic servo valve (EHSV) 143 connected in fluid communication with the outlet line 115 of the recirculation pump 111, 211, with the recirculation return line 137, and with a control line 145 connecting the EHSV 143 in fluid communication with a control port 147 of the first selector valve 135 for control of the first selector valve 135.

With reference again to FIGS. 1-2, embodiments can include any other suitable components, e.g., the boost pump 153 on the inlet line 105 connected to receive fuel supplied from the fuel tank 117. The boost pump 153 has a boost inlet connected to a tank line 157 to supply the boost pump 153 from tank 117. The outlet of the boost pump 153 is connected to supply the input line 105 with fuel at pressure P1. A filter 155 in the input line 105 upstream of the main pump 103, 203 and of the recirculation pump 111, 211. The recirculation return line 137 is connected in fluid communication to return fluid to the input line upstream of the filter 155 in the bypass mode, but could optionally be connected to the tank 117. The tank 117 is connected to receive cooled fuel from the one or more coolers 119*a-c* through line 159.

Systems and methods as disclosed herein provide potential benefits including the following. Systems and methods as disclosed herein can move all coolers into a low pressure zone to reduce weight. They can reduce pump rise required from the boost stage to reduce horsepower extraction. They can provide for independent control of thermal recirculation flows, and can provide a backup pumping stage to the main fuel control for added failure immunity.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fuel system, comprising:
a main pump assembly having:
a main fuel pump connected to an input line and configured to pump fuel to a main fuel control via a main fuel control line;
a recirculation pump connected to the input line;
a fuel recirculation system connected to an outlet line of the recirculation pump and upstream of the main fuel control, the fuel recirculation system configured to select a mode from a plurality of modes, wherein the plurality of modes include a recirculation mode and a backup mode, wherein the fuel recirculation system is configured to recirculate fuel from the recirculation pump to a tank through one or more coolers in the recirculation mode, and provide fuel to the main fuel control in the backup mode; and
a recirculation control configured to select between the recirculation mode and the backup mode, wherein the recirculation control includes:
a first selector valve in fluid communication with the outlet line of the recirculation pump, with a recirculation return line connected to return fuel to the input line, and with an inter-valve line, wherein the first selector valve is configured to select between connecting the outlet line of the recirculation pump with either the recirculation return line or with the inter-valve line; and
a second selector valve in fluid communication with the inter-valve line, with a back-up line connecting the second selector valve to the main fuel control, and with a cooler recirculation line connected to supply the one or more coolers, wherein the second selector valve is configured to select between connecting the inter-valve line with either the back-up line or with the cooler recirculation line.

2. The system of claim 1, further comprising a check valve in the backup line configured to open to provide backup fuel flow to the main fuel control from the recirculation pump in the backup mode and to prevent back flow in the backup line otherwise.

3. The system of claim 1, wherein the cooler recirculation line includes a pressure regulating valve configured to only allow flow through the cooler recirculation line above a predetermined pressure.

4. The system of claim 1, wherein the second selector valve is passively controlled based on pressure in the backup line.

5. The system of claim 1, wherein the recirculation control includes an electrohydraulic servo valve (EHSV) connected in fluid communication with the outlet line of the recirculation pump, with the recirculation return line, and with a control line connecting the EHSV in fluid communication with a control port of the first selector valve for control of the first selector valve.

6. The system of claim 1, wherein the plurality of modes includes a bypass mode, wherein the fuel recirculation system is configured to bypass the one or more coolers in the bypass mode, wherein the recirculation control is configured to select between the recirculation mode, the backup mode, and the bypass mode.

7. The system of claim 1, wherein the fuel recirculation system includes the one or more coolers in fluid communication with the recirculation control downstream of the recirculation control, and in fluid communication with the tank via a tank return line.

8. The system of claim 1, further comprising the main fuel control connected to the main fuel control line of the main pump assembly and the backup line.

9. The system of claim 8, further comprising an augmenter pump fuel control in fluid communication with the inlet line in parallel with the main fuel control, the main fuel pump, and the recirculation pump.

10. The system of claim 9, further comprising an actuator pump fuel control in fluid communication with the inlet line in parallel with the augmenter pump fuel control.

11. The system of claim 10, wherein the main fuel control, the augmenter pump fuel control, and the actuator pump fuel control are interconnected for mutual backup.

12. The system of claim 1, further comprising a filter in the input line upstream of the main pump and of the recirculation pump.

13. The system of claim 1, wherein the recirculation return line is connected in fluid communication to return fluid to the input line upstream of the filter in the bypass mode.

14. The system of claim 1, wherein the main fuel pump and the recirculation pump are positive displacement pumps.

15. The system of claim 14, wherein the positive displacement pumps are vane pumps.

16. The system of claim 14, wherein the positive displacement pumps are gear pumps.

17. The system of claim 14, further comprising a boost pump with an boost inlet connected to a tank line to supply the boost pump from the tank, wherein an outlet of the boost pump is connected to supply the input line.

18. The system of claim 17, wherein the boost pump, and at least one of the positive displacement pumps are connected to rotate together on a single shaft.

19. The system of claim 17, further comprising the tank connected in fluid communication to supply the boost pump, wherein the tank is a fuel tank.

20. The system of claim 19, wherein the tank is connected to receive cooled fuel from the one or more coolers.

\* \* \* \* \*